(12) United States Patent
Zhang et al.

(10) Patent No.: US 9,255,669 B2
(45) Date of Patent: *Feb. 9, 2016

(54) LENS, LED MODULE AND ILLUMINATION SYSTEM HAVING SAME

(71) Applicant: Wanjiong Lin, Ningbo (CN)

(72) Inventors: Fawei Zhang, Ningbo (CN); Le Xu, Ningbo (CN); Wanjiong Lin, Ningbo (CN)

(73) Assignees: Wanjiong Lin, Ningbo (CN); Ningbo Self Electronics Co., Ltd., Ningbo (CN); Self Electronics USA Corporation, Norcross, GA (US); Ningbo Hi-Tech Park Self Electronics Co., Ltd., Ningbo (CN); Ningbo Hi-Tech Park Coil Electronics Co., Ltd., Ningbo (CN)

( * ) Notice: Subject to any disclaimer, the term of this patent is extended or adjusted under 35 U.S.C. 154(b) by 215 days.

This patent is subject to a terminal disclaimer.

(21) Appl. No.: 14/012,635

(22) Filed: Aug. 28, 2013

(65) Prior Publication Data

US 2014/0071694 A1  Mar. 13, 2014

(30) Foreign Application Priority Data

Sep. 13, 2012  (CN) .......................... 2012 1 0359382

(51) Int. Cl.

| | | |
|---|---|---|
| *F21K 99/00* | (2010.01) | |
| *F21V 13/04* | (2006.01) | |
| *F21V 5/04* | (2006.01) | |
| *F21V 7/00* | (2006.01) | |
| *G02B 19/00* | (2006.01) | |
| *F21V 5/00* | (2015.01) | |
| *F21Y 101/02* | (2006.01) | |

(52) U.S. Cl.
CPC . *F21K 9/50* (2013.01); *F21V 5/004* (2013.01); *F21V 5/04* (2013.01); *F21V 7/0091* (2013.01); *F21V 13/04* (2013.01); *G02B 19/0061* (2013.01); *F21Y 2101/02* (2013.01)

(58) Field of Classification Search
CPC .................................. F21K 9/50; F21V 13/04
USPC ...................................................... 362/311.02
See application file for complete search history.

(56) References Cited

U.S. PATENT DOCUMENTS

| | | | |
|---|---|---|---|
| 6,218,785 B1* | 4/2001 | Incerti .......................... | 315/185 S |
| 6,582,103 B1* | 6/2003 | Popovich et al. ............. | 362/307 |
| 6,724,543 B1* | 4/2004 | Chinniah et al. ............... | 359/718 |
| 7,540,635 B2* | 6/2009 | Kim et al. ....................... | 362/327 |
| 7,959,328 B2* | 6/2011 | Wanninger .................... | 362/309 |

(Continued)

*Primary Examiner* — Laura Tso

(74) *Attorney, Agent, or Firm* — Wang Law Firm, Inc.

(57) ABSTRACT

An illumination system includes at least an LED module, and at least an illuminated area. The LED module includes an LED, and a lens mounted in light path of the LED. The lens includes a light source recess, a first light emitting surface, a critical reflecting surface, and a second light emitting surface. The first light emitting surface can receive more light quantity than the second light emitting surface. In result, although the light emitted from the first light emitting surface may have greater attenuation than the light emitted from the second light emitting surface, light emitted from the first light emitting surface, which is father to the illuminated are, can make up the intensity losses of attenuation as the first light emitting surface receives more light quantity than the second light emitting surface. As a result, the illumination system has a uniform illumination pattern.

19 Claims, 7 Drawing Sheets

(56) References Cited

U.S. PATENT DOCUMENTS

| | | | |
|---|---|---|---|
| 8,118,457 B2* | 2/2012 | Kanai | 362/327 |
| 8,134,780 B2* | 3/2012 | Ominato et al. | 359/599 |
| 8,459,845 B2* | 6/2013 | Chang | 362/326 |
| 8,622,586 B2* | 1/2014 | Lee et al. | 362/311.02 |
| 2007/0183736 A1* | 8/2007 | Pozdnyakov et al. | 385/146 |
| 2010/0226143 A1* | 9/2010 | Cheung | F21S 48/1159 362/516 |
| 2010/0238666 A1* | 9/2010 | Ominato et al. | 362/308 |
| 2011/0194288 A1* | 8/2011 | Hsu | 362/282 |
| 2012/0044699 A1* | 2/2012 | Anderson | F21V 5/04 362/307 |
| 2014/0071693 A1* | 3/2014 | Zhang | G02B 19/0028 362/309 |

\* cited by examiner

LENS, LED MODULE AND ILLUMINATION SYSTEM HAVING SAME

CROSS-REFERENCE TO RELATED APPLICATIONS

This application claims the benefit of priority to Chinese application CN201210359382.8, filed on Sep. 13, 2012 with the State Intellectual Property Office of the People's Republic of China and incorporated herein in its entirety by reference.

BACKGROUND

1. Technical Field

The disclosure relates to electrical lighting devices, and more particularly to an illumination system providing an uniform illumination pattern, lens and LED module used in the illumination system.

2. Description of the Related Art

For years, people have used traditional incandescent or fluorescence lighting apparatus in order to address their interior lighting concerns. However, such lighting apparatus presents a number of drawbacks. For example, the popular halogen apparatus presents the following drawbacks, such as relatively high power consumption, inefficiency of light dispersion due to the placement of its metal shield in the line sight of the halogen bulb, and its limited effectiveness in preventing glare from the halogen bulb.

Recently, a number of LED lighting apparatuses have been designed to replace the halogen apparatus, as well as other traditional incandescent or fluorescence lighting apparatuses. But, due to mediocre light output, LED used in the past was primarily limited to applications where only small surface areas were illuminated. In these applications the light was concentrated into a narrow beam using an optic designed to take the wide angle light output of an LED and collimate it using a lens, discussed below with respect to FIG. 7. FIG. 7 shows a traditional light illumination system. The light illumination system includes an illuminated area 1, and an LED light module 2 positioned beside the illuminated area 1. The LED light module 2 has a light emitting surface 3 and light 4 emitted forward of the light emitting surface 3 illuminate the illuminated area 1. Understandably, regardless of where the LED light module is disposed with relationship of the illuminated area 1, part of the light 4 illuminates the illuminated area 1 which is closer to the LED light module 2 and the other illuminates the illuminated area 1 which is farther to the LED light module 2. Since the performance of the above illumination is inevitable, part of the light 4, which illuminates the illuminate area 1 and is farther to the LED light module 2, has more attenuation than the other which illuminates the illuminate area 1 and is closer to the LED light module 2. However, the light 4 emitted from the light emitting surface 3 has same initial light intensity. As a result, the illumination value of the illuminated area 2 varies with the distance between the illumination area 1 and the LED light module 2. Examples of some applications of the light illumination system include exhibition hall, showcase, and so on. These new applications require different optical designs. In particular these applications require uniform illumination in the illumination area 2 for improving the sense of quality of the showed products to people.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
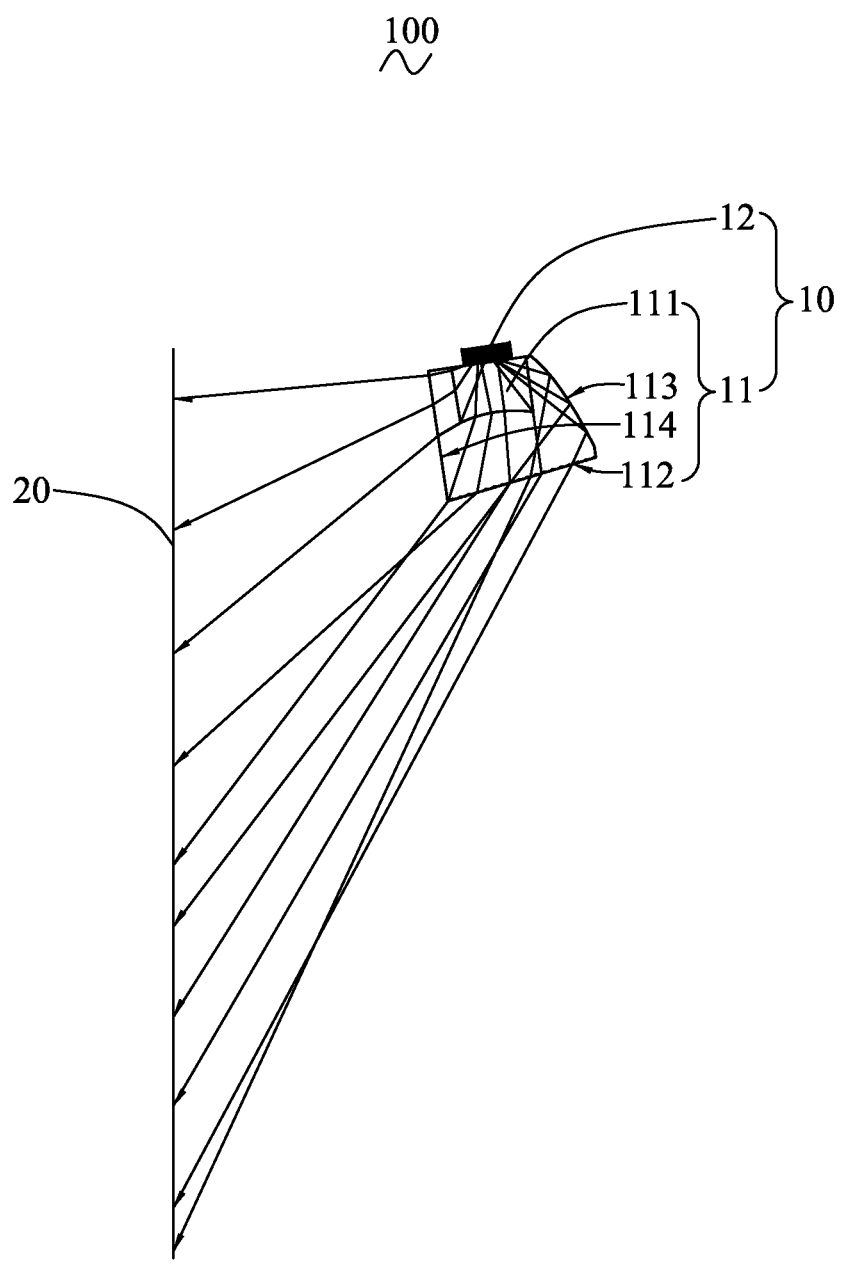
FIG. 1 is a light path view of an illumination system in accordance with one embodiment of the disclosure.

Referring to FIG. 1, a light path view of an illumination system 100 is shown. The illumination system 100 includes at least an LED module 10, and at least an illuminated area 20 according to each of the LED module 10. In actual applications, there may have many LED modules 10 which is determined by the quantity and the area of the illumination area 20. In the present embodiment, only for explaining the present disclosure, one LED module 10 and one illuminated area 20 are shown as example. Understandably, the illumination system 100 includes other components, such as house, base for mounting the LED module 10, cover, and power source for providing power to the LED module 10, and so on, but which need not be explained.

Figure 2:
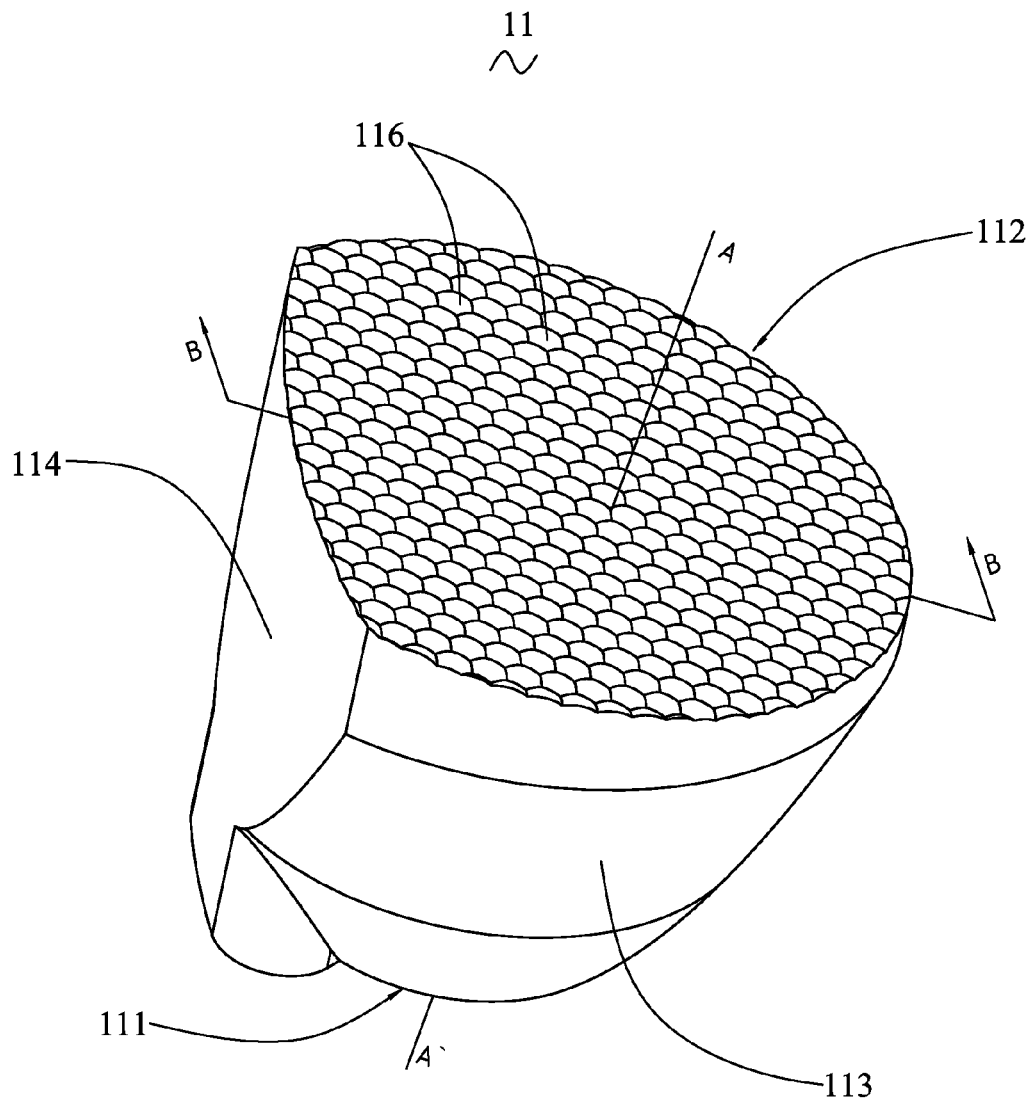
FIG. 2 is an isometric view of one lens of the illumination system of FIG. 1.
Figure 3:
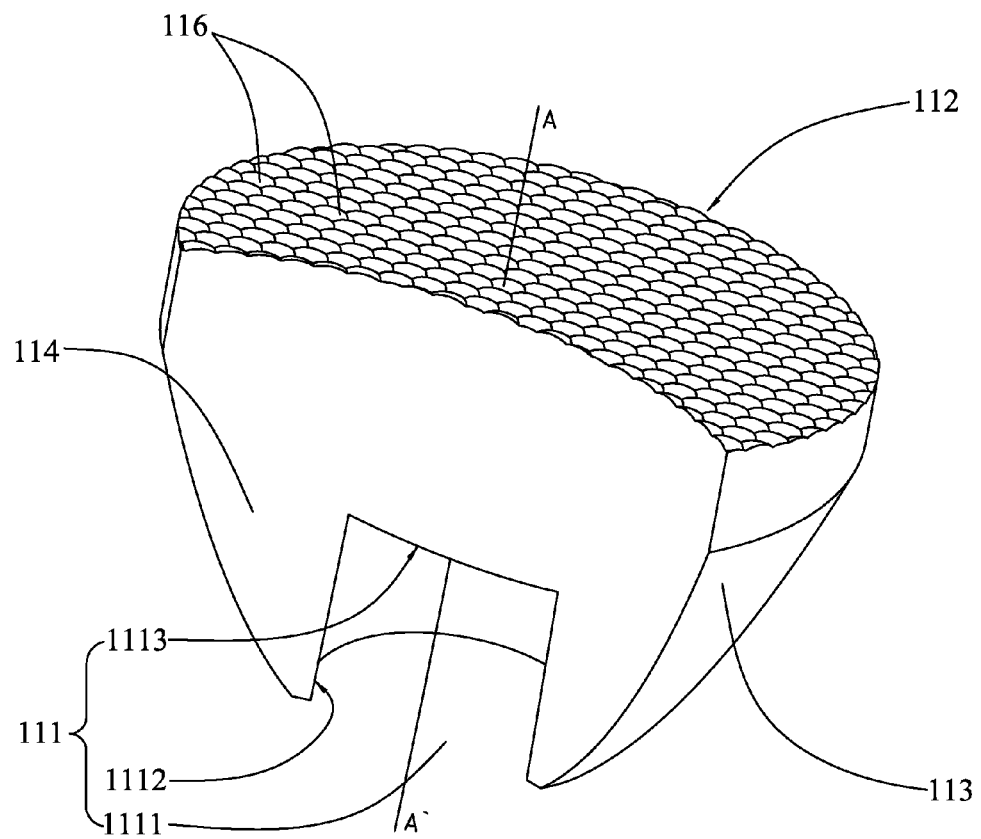
FIG. 3 is an isometric view of another lens of the illumination system of FIG. 1.

The LED module 10 includes an LED 12, and a lens 11 arranged on light path of the LED 12. Referring to FIG. 2 and FIG. 3, the lens 11 includes a light source recess 111 for receiving a light source, a first light emitting surface 112 opposite to the light source recess 111, a critical reflection surface 113 formed between the light source recess 111 and the first light emitting surface 112, and a second light emitting surface 114 formed between the light source recess 111 and the first light emitting surface 112. Understandably, the lens 11 also includes an optical axis AA' as same as the traditional lens.

Figure 4A:
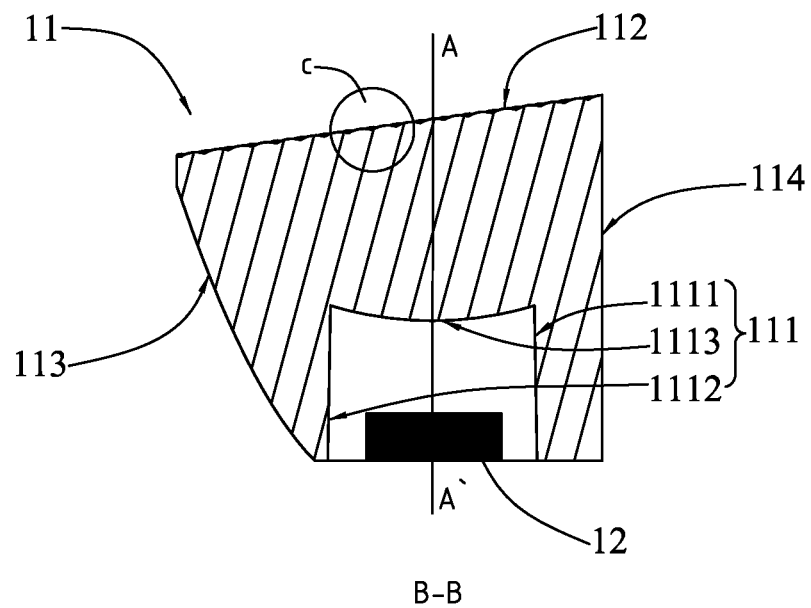
FIG. 4A-FIG. 4B are section views of an LED module having the lens of FIG. 2 taken along B-B line.
Figure 4B:
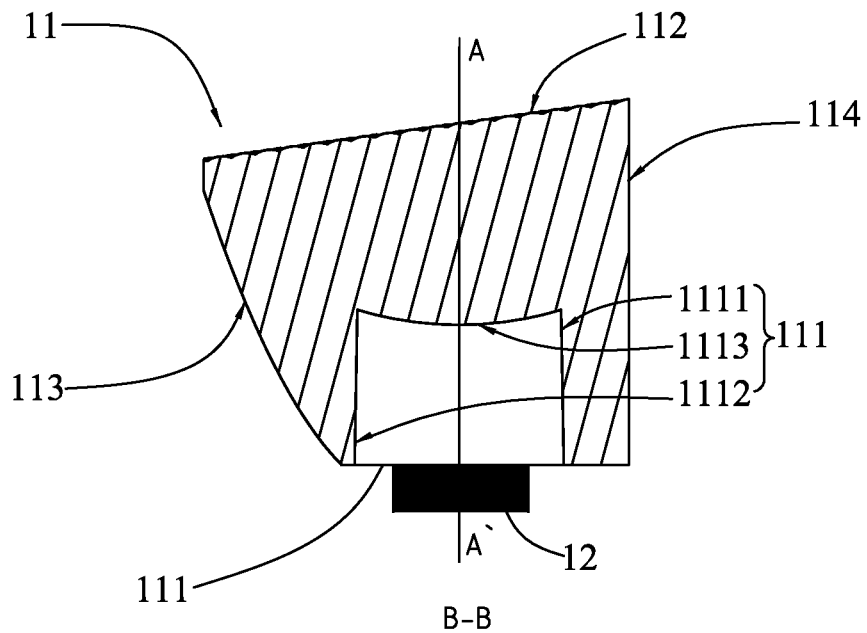

The light source recess 111 is used for arranging the light source, such as the LED 12, or other traditional light source. In the present embodiment, the light source is the LED 12. When dimension scale between the lens 11 and the light source is same as that between the lens 11 and the LED 12, the light source may be other traditional light source, such as incandescent or fluorescence lighting apparatuses, and so on. As shown in FIG. 4A and FIG. 4B, the LED 12 may be mounted into the light source recess 111 or at outer side of the light source recess 111. When the LED 12 is disposed into the light source recess 111, a bottom side of the LED 12 is flush with an end of the light source recess 111 for sufficiently taking advantage of the light emitted forward of the LED 12 and ease to assemble the lens 11 and the LED 12. When the LED 12 is mounted at outer side of the light source recess 111, a light emitting side of the LED 12 is flush with the end of the light source recess 111 for sufficiently taking advantage of the light emitted forward of the LED 12. In the present embodiment, the bottom side of the LED 12 is flush with the end of the light source recess 111. The light source recess 111 has a central axis which overlaps with the optical axis AA' of the lens 11 for ease to optic design and is divided into three parts according to orientation of the emitting light thereof. Therefore, the light source recess 111 includes a first side 1111 facing to the critical reflection surface 113, a second side 1112 facing to the second light emitting surface 114, and a top side 1113 facing to the first light emitting surface 112. The light received by the first side 1111 illuminates onto the critical reflection surface 113 and is reflected into the first light emitting surface 112 by the critical reflection surface 113. The light received by the second side 1112 illuminates onto the second light emitting surface 114 and is refracted by the second light emitting surface and emit out forward of the second light emitting surface 114. The light received by the top side 1113 shot into the first light emitting surface 112 and emit out forward of the first light emitting surface 112.

Figure 5A:
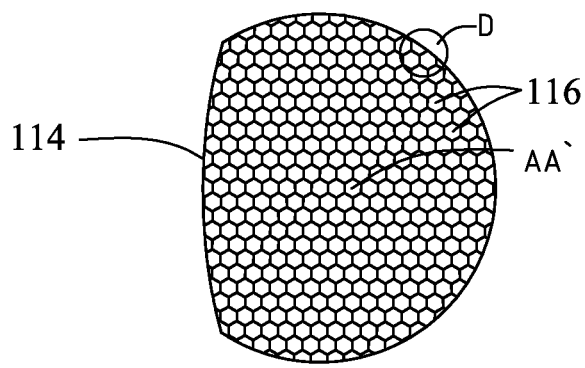
FIG. 5A-FIG. 5C are plan views of the lens of FIG. 2 which have different radius.
Figure 6A:
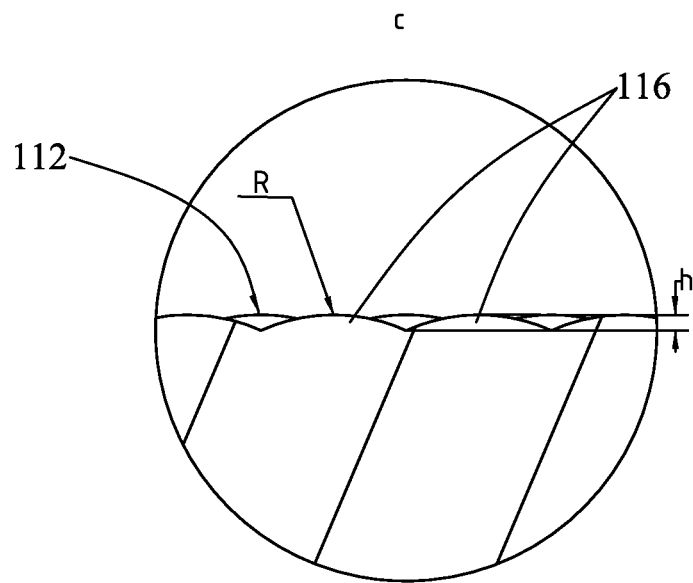
FIG. 6A-FIG. 6B are partially enlarged views of the lens of FIG. 5A at C and the lens of FIG. 6A at D.
Figure 6B:
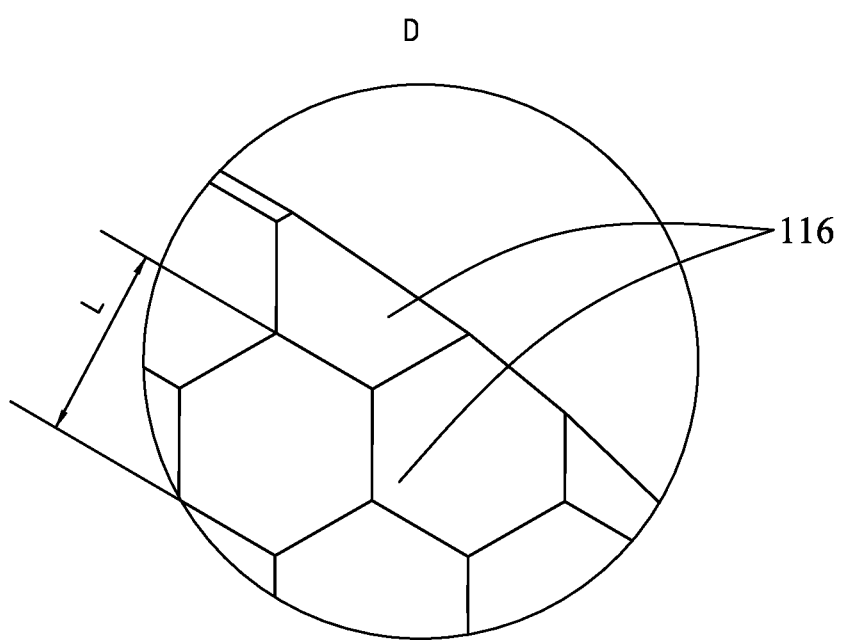
Figure 7:
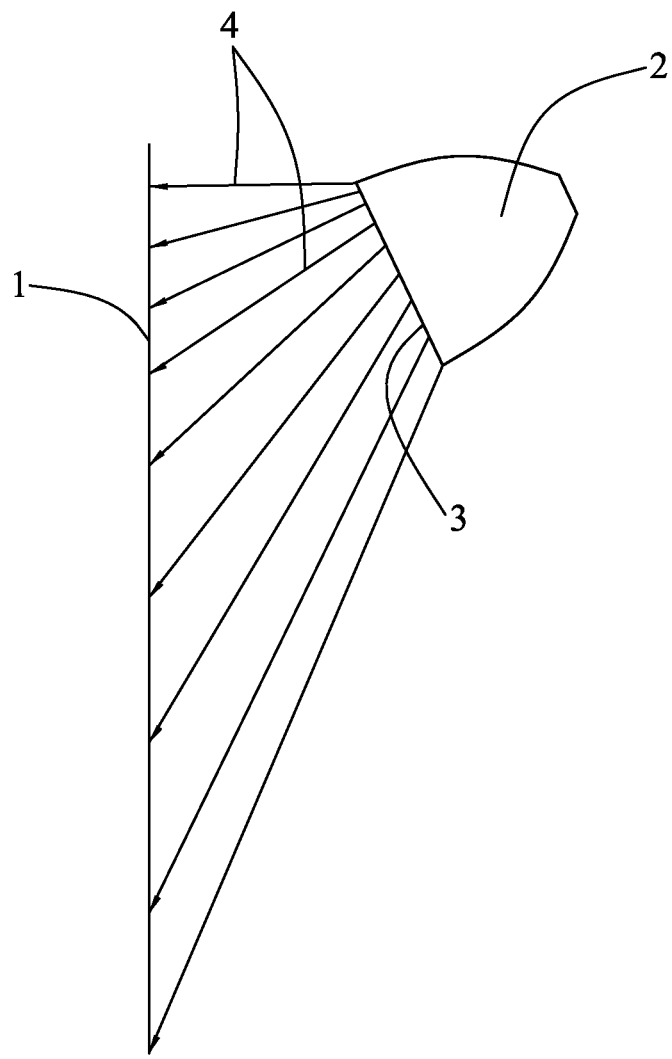
FIG. 7 is a light path view of a traditional illumination system in prior art.

The first light emitting surface 112 is configured for refracting the light emitted forward of the LED 12 to illuminate the illuminated area 20 and has a plan view or a cambered view. In order to control beam width of the light emitted forward of the LED 12 so as to form controlled illumination pattern on the illuminated area 20, a plurality of convex lenses 116 are formed in the radial direction and in the circumferential direction around the LED 12 which is provided at the center thereof. As shown in FIG. 6A, which is a partially enlarged view of FIG. 4A at C, it shows a radius R and a height h of the convex lenses 116. FIG. 6B, which is a partially enlarged view of FIG. 5A at D, shows as hexagonal shaped regions having a lateral dimensional L. The convex lenses 116 have the radius R, the height h, and the lateral dimensional L which are designed according to beam wide of incident light. According to embodiments of the present invention, the convex lenses 116 can be made to provide different beam widths by varying the parameters such as R, h, and L. For example, in one embodiment, a configuration with R=3.0 mm, h=0.1 mm, L=1.33 mm is used for a narrow beam having a beam width of about 12-17 degrees; R=2.0 mm, h=0.55 mm, and L=3.0 mm is used for a wide beam having a beam width of about 25-30 degrees. Understandably, the convex lenses 116 may be not formed on the first light emitting surface 112.

The critical reflection surface 113 is formed a inclined surface like a mortar to reflecting the light form the LED 12 into the first light emitting surface 112 and is designed to have an angle capable of reflecting the light emitted from the LED 12 to be emitted from the first light emitting surface 112.

Figure 5B:
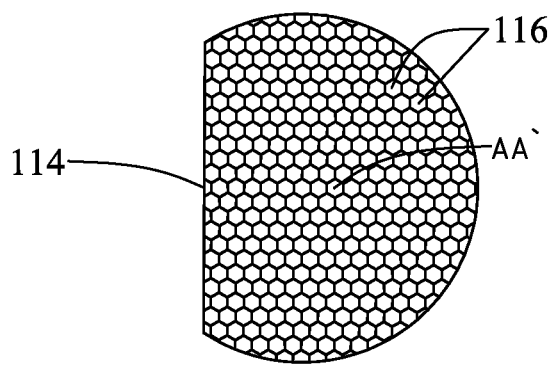
Figure 5C:
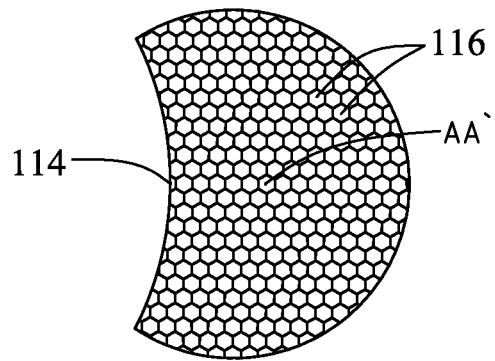

The second light emitting surface 114 is formed between the first light emitting surface 112 and the light source recess 111 and jointed to the critical reflection surface 113. The second light emitting surface 112 extends from the light source recess 111 towards the first light emitting surface 112 for the second light emitting surface 112 to receive maximum light quantity. Therefore, a height of the second light emitting surface 114 along the optical axis AA' of the lens 11 is bigger that or equal to a longitudinal length of the light source recess 111. In the present embodiment, the second light emitting surface 112 extends from the light source recess 111 to the first light emitting surface 112 for facilitating manufacture. In addition, the second light emitting surface 114 may have a plan view or a cambered view for forming different illumination pattern. When the second light emitting surface 114 has a cambered view, a radius thereof related to the optical axis AA' may be positive curvature or negative curvature as shown in FIG. 5A, FIG. 5B and FIG. 5C. In the present embodiment, the second light emitting surface 114 has a cambered view with a positive curvature related to the optical axis AA'. A profile line of the second light emitting surface 114 along the optical axis AA' of the lens 11 may be parallel to the optical axis AA' or has an inclined angle with the optical axis AA'. In the present embodiment, the profile line of the second light emitting surface 114 is parallel to the optical axis AA' of the lens 11. Moreover, the lens 11 may include a plurality of the second light emitting surfaces 112 formed thereon for achieving special illumination pattern, such as further reducing light intensity of the second light emitting surface 114. For controlling the light quantity of the second light emitting surface 114, the LED 12 may be placed inside the light source recess 111 as shown in FIG. 2 or the light from the LED 12 may pass through the light source recess 111 as shown in FIG. 3.

The LED 12 is a semiconductor light source and transforms power into light. The LED 12 presents many advantages over traditional light sources including lower energy consumption, longer lifetime, improved physical robustness, smaller size, and faster switching. A center of the LED 12 is arranged on the optical axis AA' of the lens 11 for ease to optic design.

The illuminated area 20 is an object illuminated by the LED module 10 and may be a plan or a curve. In the present embodiment, only for explaining the configuration and principle of the disclosure, the illuminated area 20 is a plan and may be a picture exhibited in museum or selling goods placing in the freezer of supermarket, and so on. As shown in FIG. 1, when assembling the LED module 10, light emitted from the first light emitting surface 112 illuminate the illuminated area 20 which is farther to the LED module 10, while light emitted from the second light emitting surface 114 illuminate the illuminated area 20 which is closer to the LED module 10.

In use, the light received by the second side 1112 of the light source recess 111 shot towards the second light emitting surface 114 and illuminate the illuminated area 20 which is closer to the LED module 10 after refracted by the second light emitting surface 114. The light received by the top side 1113 and the first side 1111 shot towards the first light emitting surface 112 and illuminate the illuminated area 20 which is farther to the LED module 10 after refracted by the first light emitting surface 112. Therefore, the first light emitting surface 112 receive more light quantity than the second light emitting surface 114. In result, although the light emitted from the first light emitting surface 112 may have greater attenuation than the light emitted from the second light emitting surface 114 as the light emitted from the first light emitting surface 112 illuminate the illuminated area 20 which is farther to the LED module 10, light emitted from the first light emitting surface 112, which is father to the illuminated are, can make up the intensity losses of attenuation as the first light emitting surface 112 receives more light quantity than the second light emitting surface 114. As a result, the illumination pattern which is closer to the LED module 10 has same luminance with the illumination pattern which is father to the LED module 10. That is to say, the illumination system 100 have uniform illumination pattern.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens comprising:
a light source recess 111 for receiving a light source, the light source has an optical axis substantially perpendicular to the light source;
a first light emitting surface 112 opposite to the light source recess 111, the first light emitting surface being substantially flat and forming an oblique angle with the optical axis;
a critical reflection surface 113 formed between the light source recess 111 and the first light emitting surface 112; and
a second light emitting surface 114 extending parallelly along the optical axis between the light source recess 111 and the first light emitting surface 112, the second light emitting surface 114 extending from the light source recess to the first light emitting surface 112,
wherein light from the light source is emitted only through the first light emitting surface and the second light emitting surface.

2. The lens of claim 1, wherein the second light emitting surface is jointed to the critical reflection surface.

3. The lens of claim 1, wherein the first light emitting surface further comprises a plurality of convex lenses facing away from the light source, each of the convex lenses has a radius, a height and a lateral dimensional which are designed according to beam wide of incident light.

4. The lens of claim 1, wherein the light source recess has a central axis which overlaps with an optical axis of the lens.

5. The lens of claim 1, wherein the light source 114 is placed inside the light source recess 111.

6. The lens of claim 1, wherein light from the light source 114 passes through the light source recess 114.

7. The lens of claim 1, wherein the second light emitting surface is flat and causes the first light emitting surface to have a shape of a truncated circle.

8. The lens of claim 1, wherein the second light emitting surface is concave and causes the first light emitting surface to have a crescent shape.

9. An LED module comprising:
at least one LED; and
at least one lens assembled with the LED, each of the lens comprising:
a light source recess for receiving the LED, the LED having an optical axis substantially perpendicular to the light source recess;
a first light emitting surface disposed opposite to the light source recess, the first light emitting surface being substantially flat and forming an oblique angle with the optical axis;
a critical reflection surface connecting the light source recess and the first light emitting surface; and
a second light emitting surface extending parallelly along the optical axis between the light source recess and the first light emitting surface,
wherein light from the LED is emitted only through the first light emitting surface and the second light emitting surface.

10. The LED module of claim 9, wherein the light source recess has a central axis which overlaps with an optical axis of the lens, a center of the LED is disposed on the optical axis of the lens.

11. The LED module of claim 9, wherein the light source recess has a central axis which overlaps with an optical axis of the lens, the LED has an LED light emitting surface which flush with the end of the light source recess, a center of the LED is disposed on the optical axis of the lens.

12. The LED module of claim 11, wherein the light source recess comprises a first side facing to the critical reflection surface, a second side facing to the second light emitting surface, and a top side facing to the first light emitting surface, the light received by the first side shot illuminates onto the critical reflection surface and is reflected into the first light emitting surface by the critical reflection surface and emit out forward of the first light emitting surface, the light received by the second side illuminates into the second light emitting surface and is refracted by the second light emitting surface and emit out forward of the second light emitting surface, the light received by the top side shot into the first light emitting surface and emit out forward of the first light emitting surface.

13. The LED module of claim 9, wherein the second light emitting surface is flat and causes the first light emitting surface to have a shape of a truncated circle.

14. The LED module of claim 9, wherein the second light emitting surface is concave and causes the first light emitting surface to have a crescent shape.

15. A illumination system comprising:
an illuminated area; and
at least one LED module for illuminating the illuminated area, the at least one LED module comprising:
at least one LED with an optical axis; and
at least one lens assembled with the at least one LED, each of the lens comprising:
a light source recess for receiving the at least one LED;
a first light emitting surface opposite to the light source recess, the first light emitting being substantially perpendicular to the optical axis;
a critical reflection surface formed between the light source recess and the first light emitting surface; and
a second light emitting surface extending parallelly along the optical axis between the light source recess and the first light emitting surface,
wherein light from the LED is emitted only through the first light emitting surface and the second light emitting surface.

16. The illumination system of claim 15, wherein a profile line of the second light emitting surface along an optical axis of the lens is parallel to the optical axis of the lens.

17. The illumination system of claim 15, wherein a profile line of the second light emitting surface along an optical axis of the lens has an inclined angle with the optical axis of the lens.

18. The illumination system of claim 15, wherein the light source is placed inside the light source recess.

19. The illumination system of claim 15, wherein light from the light source passes through the light source recess.

* * * * *